United States Patent [19]

Ahner et al.

[11] Patent Number: 4,484,049

[45] Date of Patent: Nov. 20, 1984

[54] LIQUID-COOLED HEAT GENERATOR FOR A VEHICLE HEATING SYSTEM

[75] Inventors: Peter Ahner, Ludwigsburg; Helmut Härer, Remseck; Siegfred Schustek, Immenstaad, all of Fed. Rep. of Germany

[73] Assignee: Robert Bosch GmbH, Stuttgart, Fed. Rep. of Germany

[21] Appl. No.: 388,891

[22] Filed: Jun. 16, 1982

[30] Foreign Application Priority Data

Jul. 29, 1981 [DE] Fed. Rep. of Germany ....... 3129817

[51] Int. Cl.³ .............................................. H05B 5/08
[52] U.S. Cl. ......................... 219/10.51; 219/10.49 R; 219/10.57; 310/54; 310/60 A
[58] Field of Search .............. 219/6.5, 10.49 R, 10.51, 219/10.43, 10.57, 10.75, 10.79, 10.41, 202; 310/68 R, 54, 60 A, 52

[56] References Cited

U.S. PATENT DOCUMENTS

| | | |
|---|---|---|
| 2,407,562 | 9/1946 | Lofgren .............................. 219/10.51 |
| 2,549,362 | 4/1951 | Bessieré et al. .................... 219/10.51 |
| 3,821,508 | 6/1974 | Hagerty ............................. 219/10.49 |

FOREIGN PATENT DOCUMENTS 2031166 12/1971 Fed. Rep. of Germany ... 219/10.51

Primary Examiner—C. L. Albritton
Assistant Examiner—M. M. Lateef
Attorney, Agent, or Firm—Frishauf, Holtz, Goodman & Woodward

[57] ABSTRACT

An additional claw-pole rotor similar to that of the alternator of a motor vehicle and excited by a similar winding is mounted on the same shaft as the rotor of the alternator and is surrounded by a stator core carrying, instead of winding, a short circuiting ring at each end and having tubular armature rods built into the stator core which run from one short circuiting ring to the other. The short circuiting rings provide channels for a heat transfer liquid that communicate with the inside of the tubular rods so that induction currents in the armature rods will heat the heat transfer liquid that is circulated through the heater of the car. An additional slip ring is necessary for the exciter current of the heat generator which may be varied or regulated to control the amount of heat generated.

8 Claims, 1 Drawing Figure

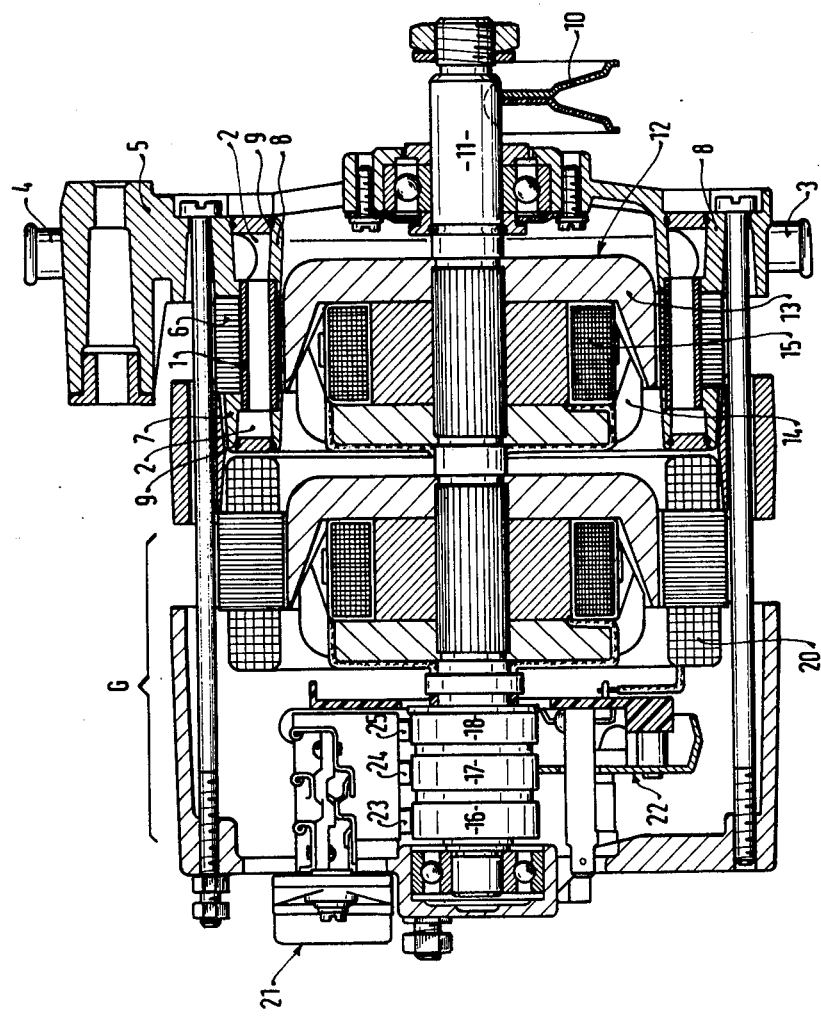

LIQUID-COOLED HEAT GENERATOR FOR A VEHICLE HEATING SYSTEM

This invention concerns a heat generator for the heating system of a motor vehicle operating on the induction principle by which high efficiency can be obtained at relatively small expense, so that it will be economic even for heating relatively small spaces, such as those of two-seater automobiles and the driver compartment of a motor truck.

THE INVENTION

It is an object of the invention to provide a rotary electric machine in which alternating currents are induced in portion of a stator structure which can be cooled by a liquid heat transfer medium, the circulation of which can provide heat to the passenger compartment of a vehicle and, further, to provide such a machine in a form in which it can readily be driven on a common shaft with the electric current supply generator of the vehicle and supplied with an exciting current therefrom.

Briefly, the rotor of the heat generator machine has a d.c. current-excited pole wheel like that of the electric current generator of a vehicle and a laminated stator core which likewise resembles that of the vehicle's alternator, since it is intended to induce alternating currents in conductors, but instead of a stator winding, short circuiting rings are provided at each end of the lamination stack of the core and armature rods are provided in the stator structure running from one of the short circuiting rings to the other. At least in these rings cooling channels are provided for contact between the rods and a cooling medium for removal of heat from the machine, and transfer of the heat elsewhere, by the heat transfer medium. Except in cases in which the armature rods are very short, the rods are preferably hollow, which is to say tubular, so that the cooling liquid can be circulated through them. The short circuiting rings also provide circumferential channels for the heat transfer medium.

THE DRAWINGS

The invention is further decribed by way of illustrative example with reference to the annexed drawing, the single FIGURE of which is a longitudinal section passing through the axis of the drive shaft of a liquid-cooled heat generator H according to the invention which is combined with a conventional electric generator G of a vehicle.

DESCRIPTION OF THE ILLUSTRATED EMBODIMENT

As shown in the drawing, armature rods 1 which are hollow are built into the laminated stator core 6 and the interiors of these tubular elements are connected together by channels 2 in the short circuiting rings 7 and 8 that are provided at the axial ends of the lamination stack of the stator. The connections for the flow of liquid in these channels and tubes is not fully defined in a sectional view like the present drawing , but of course various connection schemes are possible for causing the liquid to flow through all the tubes. One possibility is to provide a meander pattern of flow through all of the armature rods in series. Another possibility is to utilize the short circuiting ring channels as manifolds for causing the flow to be in parallel through all of the armature tubes 1. Still another, which like the meander pattern, is convenient for where the inlet and outlet are in the same plane as one of the short circuiting rings, is to subdivide the circumferential channels, in the short circuiting ring which is at the inlet/outlet end of the core, into two semi-circular manifolds, so as to feed the liquid through half of the tubes in parallel to the circular channel of the other short circuiting ring and then back through the other half of the tubes to the semicircular exit manifold. The liquid provided as the heat transfer medium, for example oil or water, is supplied in the illustrated case through the inlet 3 and returned to the circulation system through the outlet 4, both the inlet 3 and the outlet 4 being located on the end plate or bell which carries the drive shaft bearing which is at the end of the shaft 11 that carries the drive pulley 10 on the outside of the casing.

In the illustrated case the tubular conductors are of relatively high resistivity and can be produced by extrusion. They are connected together at both ends of the stator lamination stack by metallic short circuiting rings 7 and 8 applied by injection molding in a shape to provide the collecting channels 2. The collecting channels are shown as of U-shaped cross-section, closed off by a flat ring. A seal to make the circumferential channels tight for liquids is in this case shown as perfected by means of the use of seal rings 9, the seal being capable of completion by welding, soldering or use of an adhesive. For corresponding dimensions it is also possible to provide the various ducts by a pressure casting process. In such stator configurations it is possible to obtain, along with a favorable magnitude of the electrical resistance for the region in which induction takes place and also a combination thereof with current concentration phenomena, a certain self limitation of the heat dissipation at higher speeds.

In the illustrated example an additional claw-pole wheel 12, which has finger-shaped claw-pole pairs around its circumference is mounted on a rotor shaft 11 arranged to be driven by a belt pulley 10, which shaft is a common shaft of the heat generator according to the invention H and of the electrical generator G for the onboard electrical power supply for the vehicle. The magnetization of the claw-poles is produced by a d.c. exciter winding 15, the ends of which are respectively connected to two of the three slip rings 16, 17 and 18, through which and through a corresponding two of the brushes 22, 24 and 25, voltage is supplied from a rectifier 22 of the bridge circuit type. The rectifier is of course connected to the three-phase stator winding 20 of the electrical generator in the usual way by connections not shown. The heating power of the heater generator can be controlled by a regulator 21 by reference to a desired value setting provided by means not shown and a measuring member likewise not shown, the control provided by the regulator 21 operating by change of the power supplied to the exciter winding 15. It is also possible to provide for drawing the excitation power from the vehicle battery rather than directly from the generator G that charges the battery.

Although the invention has been described with reference to a particular illustrative embodiment, it will be understood that variations and modifications are possible within the inventive concept. For example, as already mentioned, when the length of the armature rods is quite short they may be solid instead of hollow, since in such a case the circulation of the heat transfer liquid through channels in the short circuiting rings bringing the liquid into contact with the rod ends may be sufficient to transfer the heat generated to the vehicle heating system. As another example, the rods do not need to be parallel to the axis of the drive shaft, as shown, but they may be skewed, preferably uniformly at some small angle to the axis.

We claim:

1. Induction electric heat generator for the personnel compartment of a motor vehicle having a shaft arranged to be driven by the vehicle engine, and further comprising:

a pole-wheel rotor on said shaft for producing a rotating magnet field;

a lamination-stack stator core surrounding said rotor and of a configuration for permeation by magnetic flux alternating polarity as a result of said rotating field;

a pair of metallic short-circuiting rings (7,8) respectively located at opposite axial ends of the lamination stack of said stator core;

a plurality of armature rods (1) built into said stator each connected at its ends respectively to said shortcircuiting rings for generating heat by the passage of induced electric current therethrough, and flow channel means for guiding a liquid heat transfer medium of a closed-circulation heat transfer system through passages in said heat generator at least part of which passages provide contact with surfaces of said armature rods, for removal of heat therefrom.

2. Induction electric heat generator as defined in claim 1 in which said armature rods (1) are hollow, thereby providing lengthwise passages therein forming part of said flow channel means for said heat transfer medium.

3. Induction electric heat generator as defined in claim 1 also comprising a housing and bearing plate (5) on which said shaft (11) is mounted and in which heat generator said connecting flow channel means include circumferential channels in said shortcircuiting rings (7,8) connecting with ends of said armature rods and also include inlet and outlet structures and connection nipples (3,4) carried on said housing and bearing plate (5).

4. Induction electric heat generator as defined in claim 2 also comprising a housing and bearing plate (5) on which said shaft (11) is mounted and in which heat generator said connecting flow channel means include circumferential channels in said shortcircuiting rings (7,8) connecting with internal passages of said armature rods and also include inlet and outlet structures and connection nipples (3,4) carried on said housing and bearing plate (5).

5. Induction electric heat generator as defined in claim 1 in which said shortcircuiting rings are injection-molded onto said stator lamination stack.

6. Induction electric heat generator as defined in claim 2, 3 or 4 in which said short circuiting rings are U-shaped and injection-molded onto said stator lamination stack, and in which covers with annular seal rings (9) are set therein to seal off flow channels therein.

7. Induction electric heat generator as defined in claim 1, 2, 3, 4, or 5 in which said shaft (11) is a common drive shaft for said heat generator (H) and for an electric current generator (G) equipped with a rectifier and serving electric current requirements of the motor vehicle and means are provided for supplying d.c excitation current for exciting electromagnets of said pole wheel rotor (12) from said electric generator and rectifier.

8. Induction electric heat generator as defined in claim 6 in which said shaft (11) is a common drive shaft for said heat generator (H) and for an electric current generator (G) equipped with a rectifier and serving electric current requirements of the motor vehicle and means are provided for supplying d.c. excitation current for exciting electromagnets of said pole wheel rotor (12) from said electric generator and rectifier.

* * * * *